United States Patent [19]

Lecoq et al.

[11]  4,274,969
[45]  Jun. 23, 1981

[54] PROCESS FOR TREATING WASTE WATER FROM PROPYLENE OXIDATION PLANTS

[75] Inventors: Jean-Claude Lecoq, Chaponost; Edouard Grimaud, Saint-Genis-Laval, both of France

[73] Assignee: Produits Chimiques Ugine Kuhlmann, Paris, France

[21] Appl. No.: 89,507

[22] Filed: Oct. 30, 1979

[30] Foreign Application Priority Data

Nov. 14, 1978 [FR] France .............................. 78 32088

[51] Int. Cl.³ .............................................. C02F 1/52
[52] U.S. Cl. .................................. 210/721; 210/726; 210/737
[58] Field of Search .................... 210/50, 63 R, 63 Z, 210/51, 52; 560/218, 191; 562/513, 600

[56] References Cited

U.S. PATENT DOCUMENTS

| 3,743,943 | 5/1973 | Fitzgibbons et al. | 210/59 |
| 4,141,826 | 2/1979 | Alford et al. | 562/600 |
| 4,161,613 | 7/1979 | Paspek, Jr. et al. | 562/600 |

FOREIGN PATENT DOCUMENTS

| 42-15527 | 8/1967 | Japan | 210/63 R |
| 50-108208 | 8/1975 | Japan | 562/513 |

Primary Examiner—Benoît Castel
Attorney, Agent, or Firm—Brooks, Haidt, Haffner & Delahunty

[57] ABSTRACT

Processes for treating the waste water, particularly waste water containing certain unsaturated compounds, from acrolein and acrylic acid production plants to reduce the chemical oxygen demand (COD), which processes comprise polymerizing the unsaturated compounds, desirably with peroxygen compounds; neutralizing the waste water with a reagent forming polyvalent metal ions to provide salts of the polymerized compounds; and separating the salts so formed.

7 Claims, No Drawings

PROCESS FOR TREATING WASTE WATER FROM PROPYLENE OXIDATION PLANTS

BACKGROUND OF THE INVENTION

This invention relates to processes for treating effluents obtained from commercial plants, and more particularly, it relates to treatment of effluents obtained during the production of acrolein and acrylic acid by the gas phase catalytic oxidation of propylene or the production of acrylic acid by the gas phase catalytic oxidation of acrolein.

The Chemical Oxygen Demand, or COD, is one of the criteria for evaluating the degree of pollution of water, as described in detail by M. Dore, N. Brunet and B. Legube in the review "Tribune Cebedeau", Vol. 28, No. 374, pp. 3–11 (1975), and is determined according to the standard AFNOR NF T 90-101 of 1971.

It is well known that acrolein and acrylic acid are generally prepared by the gas phase catalytic oxidation of propylene, and that these reactions require the presence of large quantities of water vapor in the gaseous reaction mixture. This results in the formation of fairly large quantities of dilute aqueous solutions, after condensation of such reaction mixture. Following separation of the main products, there remain undesirable aqueous effluents containing organic compounds in amounts of one to five percent by weight. These consist mainly of acrylic acid, acetic acid, and acrolein, together with other by-products such as propionaldehyde, acetone and formaldehyde, in smaller quantities.

The dilution, and volume, of these effluents are such that it is not economically practicable to destroy them by incineration. Moreover, when the content of organic compounds is high, of the order of 10,000 to 50,000 mg/L, expressed in terms of the Chemical Oxygen Demand (COD), for example, which also corresponds to a high Biochemical Oxygen Demand (the BOD is another criterion for evaluating the degree of pollution of water, and is also described in the above-mentioned article by M. Dore), the use of biological treatment methods, such as activated sludges, bacterial beds, or deep wells, for these effluents results in such high investment and conversion costs as to make these processes unsuitable for use.

The same applies to the recovery processes which attempt to make use of the organic derivatives contained in these effluents, such as the liquid-liquid extraction described, for example, in U.S. Pat. No. 3,816,524 for the concentration of an aqueous solution containing 1.9% by weight of acrylic acid, or in the article by R. W. Helsel in the review "Chemical Engineering Progress", Volume 73, (No. 5), pp. 55–59 (1977). Moreover, the large number of organic derivatives which comprise this waste water rules out the use of other processes such as electrodialysis, as described, for example, in Japanese Pat. No. 48-7610 of Mar. 7, 1973.

The detoxification of waste water from the production of acrylates by catalytic oxidation on pyrolusite, or on copper- or chrome-based catalysts, in the vapor phase, yields high degrees of purification, according to the studies made by V. S. Saltanov reported in "Khim. Prom.", Volume 44, No. 1, pp. 32–33 (1968). Moreover, the gaseous mixture obtained from this operation, consisting essentially of air and vapor, can be recycled into the oxidation stage of the propylene or acrolein, as described in Japanese Pat. Nos. 75-108,208 and 76-103,644 filed on Feb. 7, 1974 and Mar. 10, 1975, respectively. However, these processes consume energy and, in spite of everything, require an incineration phase for the destruction of the concentrated condensates.

THE INVENTION

It has been found, according to the present invention, that it is possible to treat industrial effluents from plants producing acrolein and acrylic acid by catalytic oxidation of propylene in the gaseous phase or for producing acrylic acid by catalytic oxidation of acrolein in the gaseous phase, whilst greatly reducing the COD and BOD of these effluents, by means of a particularly simple process requiring little investment and incurring only relatively low raw material and energy costs. With the process of this invention, a substantial reduction in the Chemical Oxygen Demand of these effluents can be obtained, particularly when there is a high concentration, more than 10 g/L, of $\alpha$- and $\beta$-ethylenically unsaturated compounds.

The processes according to the present invention for eliminating the acrylic monomers contained in such effluents, comprise carrying out polymerization of the ethylenically unsaturated monomers in aqueous solution in the presence of a peroxide derivative at a temperature of between 20° C. and 150° C., effecting neutralization using a reagent which generates polyvalent metal ions, in order to precipitate the corresponding polyacrylates, which are insoluble, and can then be separated off by physical separation, as by centrifuging, filtering or decanting.

The catalysts used in the polymerization according to the present invention are conventional radical polymerization initiators such as water-soluble peroxide derivatives. These include soluble salts of peracids, desirably inorganic peracids. A preferred catalyst in certain embodiments is hydrogen peroxide. The catalyst is used in a quantity of from 1 to 50%, based on the weight of acrylic monomers, depending on the desired reaction rate.

The catalysts can be used in their standard commercial form. Hydrogen peroxide, in particular, can be used in the form of usual commercial aqueous solutions containing 30% or 70% by weight of $H_2O_2$.

The reaction temperature and pressure can also be chosen to control the duration of the polymerization process step. The polymerization is desirably carried out at elevated temperatures and can be effected under atmospheric or superatmospheric pressures. It is preferred in certain embodiments to work at a temperature of between 80° and 100° C., at ordinary pressure, or to carry out the process under pressure at temperatures of up to 110° C. or more.

The base used for the neutralization and precipitation of the polymers is one providing polyvalent metal ions. Such bases include alkaline earth metal salts and derivatives of metals with a valence of more than one, such as aluminum, chromium, zinc, lead, and the like. In certain embodiments, an alkaline earth metal hydroxide, particularly calcium hydroxide, barium hydroxide or strontium hydroxide, is preferred.

The ratio of the base to the monomers contained in the effluent is desirably about stoichiometric, but it can also be determined by the pH to be obtained in the treated waste water.

Precipitation is promoted by the use of the alkaline earth metal hydroxide in the form of an aqueous suspension, thus preventing the agglomeration of the polymer particles formed.

The efficiency of this process increases when the polymerization and then the neutralization of the acrylic monomers contained in the residual water thus treated are carried out successively. However, it is also possible to carry out these two operations in reverse order, if need be. Nevertheless, the polymerization rate of acrylic monomers is higher when they are in non-neutralized form.

After decanting or filtering, the residual water obtained according to this process has a substantially reduced content of organic substances, so that, if further purification is desirable, it can be completed at low cost using known methods, such as biological treatment. The sludges of insoluble polymer salts recovered according to the invention can easily be eliminated by incineration or can be made use of in various known fields of use for calcium polyacrylates, for example, such as the treatment of soil; reinforcing plaster, cement, concrete, and the like.

The following Examples are given to illustrate embodiments of the invention as it is presently preferred to practice it. It will be understood that these Examples are illustrative, and the invention is not to be considered as restricted thereto except as indicated in the appended claims. All parts, percentages, proportions, and ratios herein are by weight unless otherwise indicated.

EXAMPLE I

A glass reactor fitted with a mechanical stirrer and having a capacity of 250 ml is charged with 100 ml of residual effluent from a propylene oxidation plant. The acidity of this effluent is 2.75%, expressed as acrylic acid, and the measured COD is 45.1 g/L.

This solution is heated to 90° C., and after the addition of a 70% aqueous solution of hydrogen peroxide to obtain a weight ratio of hydrogen peroxide to acrylic acid of 25%, the mixture is stirred for three hours. Powdered lime is then added until the solution has a pH of 8.75. After filtering off the precipitate, the solution thus treated has a COD of 16.2 g/L, corresponding to a 64% reduction in the COD of the original effluent.

EXAMPLE II

A 250 ml glass reactor fitted with a mechanical stirrer is charged with 100 ml of residual effluent from a propylene oxidation plant. The acidity of this effluent is 2.12%, expressed as acrylic acid, the COD is 30 g/L, and the pH is 2.58. This acidity is neutralized to pH 8.75 by the addition of an aqueous suspension of calcium hydroxide.

The solution so obtained is heated to 90° C., and after the rapid addition of a 70% aqueous solution of hydrogen peroxide to give a ratio of hydrogen peroxide to monomer of 25%, the mixture is stirred for five hours. After filtration of the precipitate obtained during polymerization, the COD of the residual water is measured and found to be 22.5 g/L, corresponding to a 25% reduction in the COD of the original effluent.

EXAMPLE III

The process described in Example I is carried out using a residual effluent with an acidity of 2.12%, as acrylic acid, and with a COD of 38.7 g/L. The powdered lime is replaced by calcium carbonate. After separation of the insoluble polymers, the effluent thus treated has a COD of 17.4 g/L, corresponding to a 47.5% reduction in the COD of the original effluent.

EXAMPLE IV

The process described in Example I is carried out on a residual effluent with an acidity of 2.12%, expressed as acrylic acid, and with a COD of 33 g/L, the aqueous hydrogen peroxide solution being replaced by solid potassium persulfate in proportions such that the ratio of persulfate to acrylic acid is 10%. After four hours' reaction at 100° C., neutralization with a milk of lime (aqueous calcium hydroxide suspension) containing 40% dry matter, and filtration of the precipitate obtained during the last stage of the treatment, the effluent has a COD of 19.8 g/L, corresponding to a 60% reduction in the COD of the original effluent.

EXAMPLE V

A 10-liter glass reactor fitted with a mechanical stirrer is charged with 6 L of residual effluent from a propylene oxidation plant. This effluent has an acidity of 2.23%, expressed as acrylic acid, and a COD of 36.6 g/L.

A 70% aqueous hydrogen peroxide solution is rapidly poured into this reactor so as to obtain a ratio of hydrogen peroxide to acrylic acid of 25%. The solution is stirred for three hours at 90° C.

Then a milk of lime containing 40% dry matter is poured into the reactor, which is maintained at 90° C., with stirring, until the solution has a pH of 8.75, corresponding to stoichiometric neutralization. After filtration of the insoluble residue, the COD of the effluent is found to be 15 g/L, corresponding to a purification efficiency of 59%.

EXAMPLE VI

A 200-liter stainless steel reactor fitted with a stirrer and a double jacket which maintains the temperature at 105° C. is continuously fed with 100 L/hr of a residual effluent containing organic substances, consisting chiefly of acrolein, acetic acid and acrylic acid, giving it a COD of 59.3 g/L, and with 1.25 L/hr of a 35% aqueous solution of hydrogen peroxide.

The effluent continuously removed from this reactor is passed into a neutralization vessel, into which is introduced a milk of lime containing 48% dry matter, in a stoichiometric quantity based on the measured acidity of the effluent, expressed as acrylic acid.

After decanting to remove the insoluble polymer sludge formed, the neutralized effluent has a COD of 12.25 g/L, representing a 79.3% reduction compared with the original effluent.

What is claimed is:

1. A process for treating unsaturated compound-containing waste water from plants for the production of acrylic derivatives, said waste water containing acrylic monomers, which process comprises polymerizing the unsaturated compounds in the waste water at a temperature between 20° and 150° C. while adding a peroxygen compound in an amount of from about 1 to 50% based on the weight of acrylic monomers, neutralizing the waste water with a reagent producing polyvalent metal ions to form insoluble salts of the polymerized compounds, and separating from the liquid the insoluble salts of polymerized compounds so formed to reduce the chemical oxygen demand (COD) of the waste water.

2. A process according to claim 1 wherein the polymerization of the unsaturated compounds is effected with the peroxygen compound and the water is thereafter neutralized.

3. A process according to claim 1 wherein the waste water is neutralized and the polymerization is thereafter effected with the peroxygen compound.

4. A process according to claim 1 wherein the peroxygen compound is hydrogen peroxide.

5. A process according to claim 1 wherein the neutralization reagent is calcium hydroxide.

6. A process according to claim 1 wherein the polymerization is carried out at a temperature of from 80° to 110° C.

7. A process according to claim 1 wherein the separation is effected by filtration or decantation.

* * * * *